(12) United States Patent
De Smet

(10) Patent No.: US 10,649,676 B1
(45) Date of Patent: May 12, 2020

(54) MEMORY COMPRESSION FOR IMMUTABLE DATA STRUCTURES

(71) Applicant: MICROSOFT TECHNOLOGY LICENSING, LLC, Redmond, WA (US)

(72) Inventor: Bart Johan Fred De Smet, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/234,942

(22) Filed: Dec. 28, 2018

(51) Int. Cl.
*G06F 3/06* (2006.01)
*G06F 16/174* (2019.01)

(52) U.S. Cl.
CPC .......... *G06F 3/0641* (2013.01); *G06F 3/0608* (2013.01); *G06F 3/0673* (2013.01); *G06F 16/1748* (2019.01)

(58) Field of Classification Search
CPC ............. G06F 3/0641; G06F 12/00–16; G06F 16/174–1756; G06F 16/184; G06F 16/24556; G06F 16/27
See application file for complete search history.

(56) References Cited

U.S. PATENT DOCUMENTS

| | | | |
|---|---|---|---|
| 8,468,138 B1 | 6/2013 | Chhaunker et al. | |
| 8,645,917 B2 | 2/2014 | Arnold et al. | |
| 8,712,974 B2 | 4/2014 | Datuashvili et al. | |
| 9,612,749 B2 | 4/2017 | Wang | |
| 2013/0346376 A1* | 12/2013 | Dmitriev | G06F 16/174 707/692 |
| 2014/0052692 A1* | 2/2014 | Zhang | G06F 11/1453 707/639 |
| 2016/0026652 A1* | 1/2016 | Zheng | G06F 16/1752 707/692 |
| 2017/0285975 A1 | 10/2017 | Trika et al. | |

OTHER PUBLICATIONS

"Memory Pool System Documentation", Retrieved <<https://media.readthedocs.org/pdf/memory-pool-system/version-1.111/memory-pool-system.pdf>>, Jan. 28, 2016, 399 Pages.
"Application as Filed in U.S. Appl. No. 15/917352", filed Mar. 9, 2018, 65 Pages.
Lange, Fabian, "String Deduplication—A new feature in Java 8 Update 20", Retrieved <<https://blog.codecentric.de/en/2014/08/string-deduplication-new-feature-java-8-update-20-21>>, Aug. 28, 2014, 8 Pages.
Marlow, et al., "Multicore Garbage Collection with Local Heaps", In Proceedings of the 10th International Symposium on Memory Management, Jun. 4, 2011, 12 Pages.

* cited by examiner

*Primary Examiner* — Nicholas J Simonetti
(74) *Attorney, Agent, or Firm* — Workman Nydegger

(57) ABSTRACT

Duplicates of immutable data objects are identified and deduplicated. This is performed by performing a bottom up deduplication, such that objects in hierarchically lower levels of a data structure are deduplicated first. Deduplication identifies duplicates of a particular object through value equality analysis and replaces pointers to duplicate objects and the duplicate objects themselves, with a reference to the particular object. This process is repeated for hierarchically higher data objects, but where the value equality analysis includes, among other things, evaluating the equality of references to hierarchically lower data objects.

20 Claims, 6 Drawing Sheets

_500_

502 — Identify First Level Immutable Data Objects Of A First Immutable Data Object Type At A First Level Of A Multilevel Data Structure

504 — Populate A First Lookup Table With Entries, Each Entry Comprising A First Level Immutable Data Object And A First Level Value Of The First Level Immutable Data Object, Wherein Populating The First Lookup Table Comprises, As A Result Of Identifying A First Instance Of A Particular First Level Immutable Data Object, Populating An Entry With The Particular First Level Immutable Data Object

506 — For The Particular First Level Immutable Data Object, Identify A Duplicate Instance Of The Particular First Level Immutable Data Object, The Duplicate Instance Of The Particular First Level Immutable Data Object Being Pointed To By A First Pointer From A Particular Instance Of A Particular Second Level Immutable Data Object

508 — As A Result Of The Particular First Level Immutable Data Object Being In The Lookup Table, Replace The First Pointer With A Reference To The First Instance Of The Particular First Level Immutable Data Object

510 — Cause The Duplicate Instance Of The Particular First Level Immutable Data Object To Be Removed From Memory, Freeing Storage Space On The Computing System

512 — Identify Second Level Immutable Data Objects At A Second Level Of The Multilevel Data Structure

514 — Populate A Second Lookup Table With Entries, Each Of One Or More Of The Entries Comprising A Second Level Immutable Data Object And A Second Level Reference To A First Instance Of A First Level Immutable Data Object, Wherein Populating The Second Lookup Table Comprises Populating A Particular Second Level Lookup Table Entry With The Particular Second Level Immutable Data Object And The Reference To The First Instance Of The Particular First Level Immutable Data Object

*FIG. 5*

MEMORY COMPRESSION FOR IMMUTABLE DATA STRUCTURES

BACKGROUND

Background and Relevant Art

Computers and computing systems have affected nearly every aspect of modern living. Computers are generally involved in work, recreation, healthcare, transportation, entertainment, household management, etc.

In computing systems, immutable (i.e., unchangeable) data structures enable sharing of data in a safe manner, for example, by being safe for multi-threaded access, as the different threads cannot change the data structure. However, when there is a desire to change a data structure, there is often a need to clone immutable portions of the structure that will not change, and add changed portions to the data structure. This results in multiple redundant copies of portions of data structures, which occupy computing resources, such as computer memory. Other sources of duplication may include serialization and deserialization of data structures where reference equality is discarded or applying the same mutation to the same data structure many times, thus creating many copies that are identical.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments identify duplicates of immutable data objects and deduplicate the immutable data objects. This is performed by performing a bottom up deduplication, such that objects in hierarchically lower levels of a data structure are deduplicated first. Deduplication identifies duplicates of a particular object through value equality analysis, and replaces pointers to duplicate objects and the duplicate objects themselves, with a reference to the particular object. This process is repeated for hierarchically higher data objects, but where the value equality analysis includes, among other things, evaluating the equality of references to hierarchically lower data objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates a method of deduplicating a data structure; and

DETAILED DESCRIPTION

Embodiments illustrated herein are directed to compression of a working set of data objects based on type metadata and a traversal of heaps to perform bottom-up deduplication of data objects. In particular, embodiments compress data structures by identifying duplicate instances of objects, creating references, from higher level objects, to a particular instance that can be reused by several different portions of the data structure (rather than needing duplicate instances), and deleting the duplicate instances to compress the data structure in memory. This creates an improved computing system as it is a computing system that is able to use a data structure in a fashion that uses less memory of the computing system than was previously required in previous systems.

Embodiments perform a bottom-up deduplication of data objects to create even more efficiencies. In particular, even though a data object may have several objects hierarchically below it, at least one set of a plurality of hierarchically lower objects can be represented by a single reference, due to the bottom up deduplication, such that object equivalents can be determined by comparing references, as well as any other appropriate fields of the object. In particular, when deduplication occurs at the lowest levels, references to duplicate objects are replaced by a reference to a single object. When the next level of deduplication occurs, objects that have the same reference (and other equivalent fields or other elements) can be identified as duplicates of each other to allow for further deduplication at higher levels. Indeed, using this methodology, reference equality can ensure equality at several different levels of a data structure, even though only a single reference is evaluated for equality, due to the bottom up nature of the process.

Figure 1:
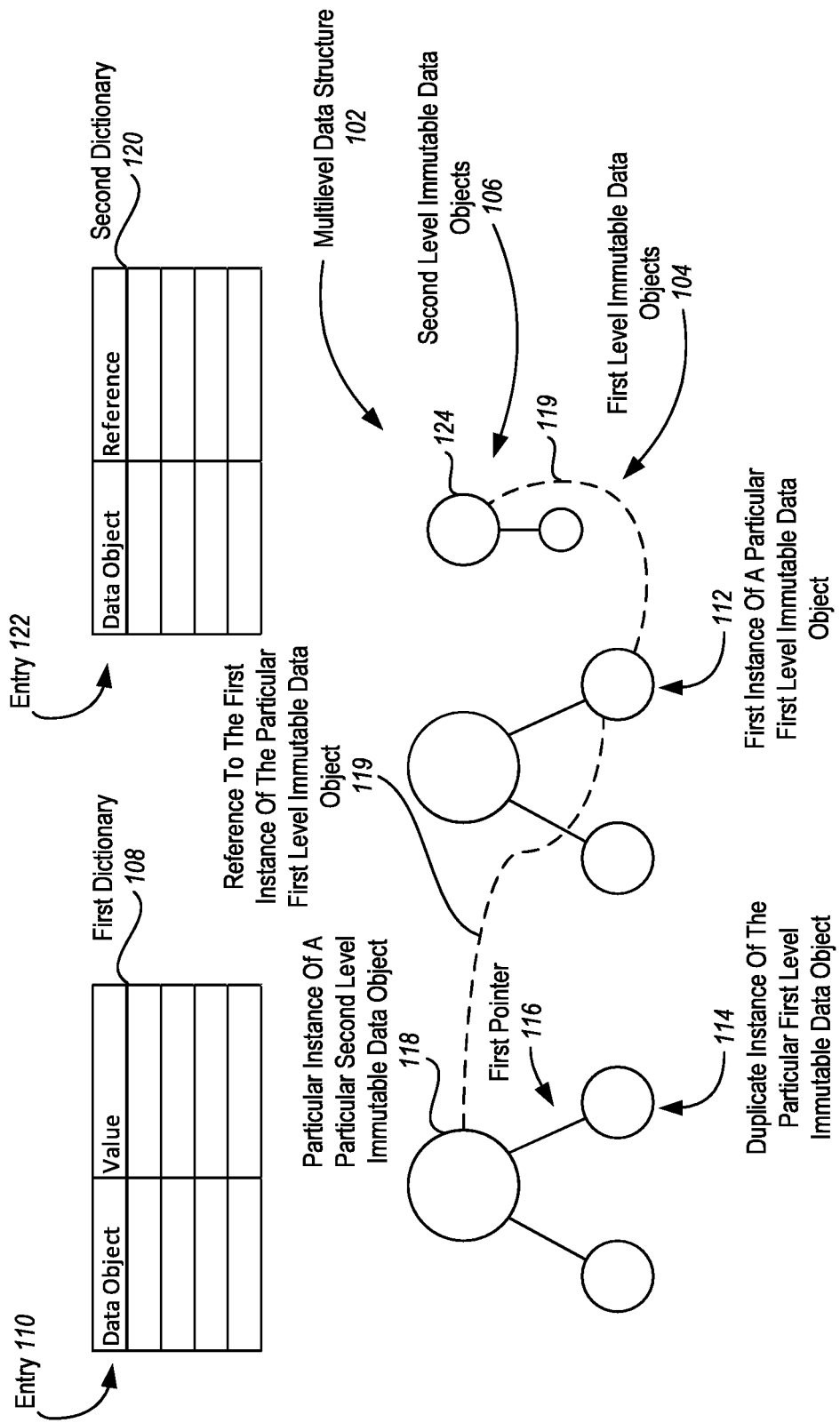
FIG. 1 illustrates deduplication of a data structure.

With reference now to FIG. 1, a basic example is illustrated. FIG. 1 illustrates a multilevel data structure 102. In this example, the multilevel data structure 102 includes various objects arranged in a hierarchical fashion. In the particular example, the objects shown are immutable and each include a duplicate object. Although this is not required, and the data structure 102 may (and typically does) include mutable objects and/or objects without a duplicate.

The multilevel data structure includes a set of first level immutable data objects 104 and a set of second level immutable data objects 106. To begin the deduplication process, a first dictionary 108 (or other lookup table) is created or accessed. Each dictionary is particular to a particular level of the multilevel data structure 102 and is particular to an object type. For example, dictionary 108 may be for level 0 strings. Alternatively, dictionary 108 may be for level 1 URIs. Alternatively, dictionary 108 may be for level 1 strings. And so forth.

In the particular example illustrated, the first dictionary 108 is for objects of a particular object type of the set of first level immutable data objects 104. The dictionary 108 will be populated with entries, where each entry includes a first level immutable data object and one or more first level values of the first level immutable data object. As will be illustrated in more detail below, having the values in the dictionary entries allows for quick and efficient discovery of duplicate data objects by identifying other data objects at the same level as determined by the dictionary, of the same type as determined by the dictionary, and having the same values as are in an entry in the dictionary.

As noted above, in some embodiments, one or more of the values may be references to data objects to allow for comparison of references rather than needing to evaluate all lower-level objects. For example, in FIG. 4, object 404 is equivalent to object 406 because they each have the same reference 406 to object 408. The bottom up deduplication causes equivalence of hierarchically lower objects 410 to be subsumed in the reference 406 such that equivalency does not need to be explicitly determined at those levels when evaluating objects 402 and 404 for equivalence, as it has already been performed previously.

In the example illustrated in FIG. 1, the first dictionary 108 is populated with an entry 110 for a first instance of a particular first level immutable data object 112. A duplicate instance 114 of the first particular first level immutable data object is identified. The duplicate instance 114 is identified as being a duplicate of the first instance 112 as a result of the two instances being the same data object and having the same value as confirmed by using the first dictionary 108. For purposes of this example, it is assumed that the first instance 112 and the duplicate instance 114 are at the lowest level of the multilevel data structure 102 such that the value in the first dictionary 108 will not be a reference, but rather will be some comparable value, such as a string, integer, or other constant. As will be illustrated in more detail below, for higher level data objects, the value might be a reference to a lower level data object.

The duplicate instance 114 is pointed to by the first pointer 116 from a particular instance of a particular second level immutable data object 118. Because the first instance of the particular first level immutable data object 112 is included in the entry 110 of the first dictionary 108, the first pointer 116 can be replaced by a reference 119 to the first instance of the particular first level immutable data object. This is typically done using native functionality of a heap walker that is able to replace pointers with references to known objects. Once this replacement has occurred, the duplicate instance 114 can be deleted to free up space in memory. This functionality is illustrated in more detail below in the discussion of heap walkers.

This process can be repeated for other duplicate instances of the first instance of the particular first level immutable data object 112 using the first dictionary 108. Additionally, this can be repeated for other objects at the first level immutable data objects 104 that are of the same object type as the first instance 112 using the first dictionary 108. Although not shown, a different dictionary will be used for objects at the first level of immutable data objects 104 that are of a different object type than the first instance of the particular first level immutable data object 112. Once the process is complete for the first level of immutable data objects 104, in some embodiments, first level dictionaries, such as the first dictionary 108, will be destroyed thus ensuring that memory leaks do not occur. Alternatively, as will be illustrated in more detail below, all or portions of the first level dictionaries (or any level dictionaries, as illustrated herein) may be maintained for future use of other processes. The process can begin for the next higher level of data objects, which in this case is the second level of immutable data objects 106.

For example, in the example illustrated in FIG. 1, a second dictionary 120 is accessed or created. As with the first dictionary 108, the second dictionary 120 is particular to the second level of immutable data objects 106, and data objects of a particular object type.

The second dictionary 120 is populated with entries where each of the entries includes a second level immutable data object type and values. Typically, at least one of the values includes a second level reference to a first instance of a first level immutable data object (assuming that the first level is at level n and the second level is at level n+1). For example, in the example shown in FIG. 1, the second dictionary 120 includes an entry 122 for the particular instance of the particular second level immutable data object 118 where at least one value in the entry 122 is the reference 119. A duplicate instance 124 of the particular second level immutable data object can be identified using the second dictionary 120 and the corresponding entry 122 to identify that the duplicate instance 124 has a reference 119 to the first instance of the particular first level immutable data object 112. That is, the duplicate instance 124 can be identified as a duplicate as a result of comparing a reference value in the entry 122 of the second dictionary 120. Deduplication can be performed as illustrated above assuming higher-level data objects (not shown) with pointers to the second level immutable data objects 106.

Having now illustrated one specific example, general principles in implementing various embodiments of the invention are now illustrated.

Use of immutable data structures often leads to the creation of data copies. When computations are independent but collocated within a shared address space, copy-avoiding strategies are largely ineffective. This pattern is common in event processing systems with a high density of standing computations which run independently but cannot be folded together entirely due to slight variations in the data flow. However, they may share common logic such as creating copies of strings to change casing, or to allocate URIs that share common prefixes. Some of these objects may be long-lived in event processing computations that involve join patterns or intentional delays. Furthermore, copies of data can originate from checkpoint/recover cycles where data may be persisted by value rather than by reference, thus undoing aliasing or deduplication effects.

Embodiments illustrated herein implement memory compression using concepts such as arenas, marking phases, and heap traversal strategies to facilitate discovering duplicates of data and to perform deduplication, without having to change or intercept the original allocator pattern.

Memory compaction runs asynchronously, away from the core computation, and can be driven by explicit stimulus, memory pressure, or other hints. In some embodiments, it relies on the execution environment defining a set of root objects from which to start a heap traversal, along with a set of fence expressions that prune the traversal (e.g. to prevent going into complex data structures that are known to be hard to optimize). Root objects may be objects having a known traversal that can be used to identify bottom level objects to begin deduplication. For example, as objects are discovered from pointer chasing, checks are made to determine whether an object is immutable (based on type analysis, from a known set of types (e.g. strings), based on language specific flags, etc.) and is considered for value-based deduplication. Tables are kept to facilitate this deduplication which can happen in a current pass, or a separate pass upon analyzing the candidate set in a global manner (e.g. based on frequency of occurrence of objects analysis).

Weak references are used to avoid extending the lifetime of objects during or across compaction cycles due to references to these objects being kept in various tables. Another such table keeps track of compaction generations, avoiding revisitation of objects or subgraphs of the heap upon consecutive compaction cycles. Traversal logic and reference edits are just-in-time (JIT) compiled for efficiency based on type information discovered during traversal.

Consider, for example, a distributed event processing system that hosts billions of always running "standing" queries over millions of event streams. These standing queries are expressed as data structures representing code, e.g. ASTs or expression trees, and need to be kept in memory for the duration of the query's lifetime (often days, months, or years) to evaluate them over incoming events.

To facilitate reliable failover of compute nodes hosting these queries (typically millions per node), these queries or computational expressions are serialized to a replicated state store periodically, through a process called checkpointing. Upon failover of the compute node to another replica, the expressions are deserialized and re-allocated in memory on the new primary compute node.

Note that computational expressions are not kept in memory on secondary replicas as to reduce memory usage. Also, the computational expressions are serialized by value, each independently from the others (i.e. an object graph is not serialized for the whole replica). This makes checkpointing more efficient because there is no need to rewrite large portions of the persisted state.

Many computational expressions share common pieces. In many cases, these expressions are instances of templates (akin to stored procedures in classic databases) and thus share a lot of logic. An expression tree representation of the computation thus offers sharing opportunities across computational expressions.

For example, "1+(2+3)" and "(2+3)+4" can share the representation of "2+3" which is common across both. This can only be done safely by assuming that the data structures that represent code are immutable. For example, if one were to edit "1+(2+3)" to "1+(2-3)", the other computation of "(2+3)+4" should not also change to "(2-3)+4".

Use of immutable data structures is well-known in a variety of disciplines, especially when concurrency is involved, because they allow for synchronization-free sharing of data structures. The drawback is that any mutations require cloning of the data structure, which is often done by maximally sharing portions of the original data structure. E.g. when changing "1+(2+3)" to "4+(2+3)", "2+3" can be reused.

Due to the serialization of expression trees "by value" (rather than an object graph where references to shared nodes are persisted as references), any sharing of nodes (effectively a form of aliasing) is lost upon recovery on a secondary replica. Hence the need to reliably de-duplicate shared nodes to compress memory usage.

Embodiments may further have an advantage of reducing the burden on the checkpoint code path as compared to previous systems. Node failure (and thus recovery) is rare, but checkpointing happens very frequently, for example in some systems, on the order of once a minute. Compute resources can be optimized for checkpointing, which in general, reduces efficiency of the node for event processing. Embodiments may be optimized to reduce I/O due to rewrites of the "object graph".

Also, in steady state, as new computations are instantiated in compute nodes, embodiments optimize time spent in the creation code path by managing (or even eliminating) attempts to compact the in-memory representation by reusing existing expression tree nodes. For example, it is possible the computation is short-lived anyway such that compaction is unnecessary as the object would shortly be removed from memory.

Systems may have a high density of many millions of computations in the same node. As such, embodiments may include functionality to ensure that memory is efficiently used "in the limit", thus prompting memory compaction as a background process. This form of heap compaction is made possible by relying on the properties of immutable data structures.

Heap Walkers

Figure 2:
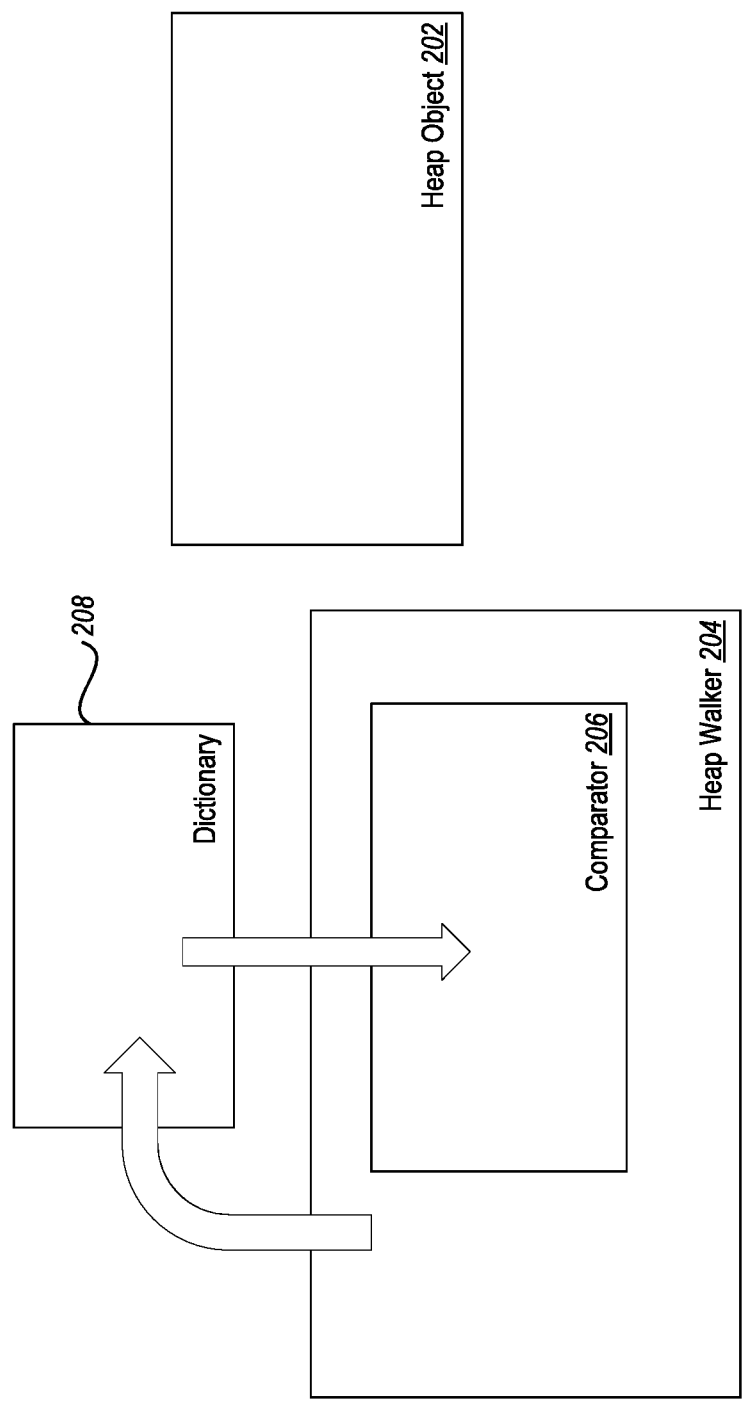
FIG. 2 illustrates a system for deduplicating data structures.

Referring now to FIG. 2, embodiments illustrated herein include functionality to walk an object heap 202 (an in-memory structure for allocating and freeing objects) reliably, without assuming any alternation of underlying virtual machines (VMs), runtimes, or frameworks. This can be done, for example, in managed languages such as Java, C#, Python, etc.

Heap walkers, such as the heap walker 204, are used for a variety of purposes, including tracing all reachable objects in the object heap 202 that are currently alive. Such a trace is then used to detect instances of types that are immutable, to gather statistics about objects, to figure out reuse count of objects (by keeping track of the number of inbound edges to an object), etc.

Some embodiments build heap walkers for types by generating code at runtime that builds traversal expressions given an object of type T into all fields contained within the object layout of the instance of type T. Note that this is not the same as looking at all the fields of an object, because structures may be inlined in an object's layout. Embodiments may use reflection and knowledge of the VM's type system to build these walkers.

Heap walkers include mechanisms to detect and avoid cycles. The use of a heap walker can originate from a single object and walk one level down or involve recursion with or without cycle detection. Typically, a heap walker is given a set of root objects to walk from and then exhaustively explores all reachable objects.

For example, to walk all the state associated with a single partition of a workload in a process (e.g. computations of a tenant), one could give a walker the object that acts as the container for all these computations, e.g. a query engine. This object acts as the root from which to start the heap walk.

To avoid traversing data structures that are not interesting for the purposes of the walk (e.g. to facilitate heap compaction), fences can be put in place. These are Boolean predicates that can be used to bail out from a recursive walk. For example, when traversing a heap 202, one may end up with a reference to some system type (e.g. a thread), which has a large number of objects underneath. Embodiments can be configured to bail out there.

References are replaced by the mechanism of the heap walk that identifies the objects at the specified level n data type. To get to these objects (unless they are roots all the way up the search space), a pointer has been chased down from objects at levels higher than n. As traversal is performed down the last pointer to the object of the type of interest, the value is looked up, an identification is made as to whether or not it is a new or a duplicate (using the dictionary) 208. If it is a duplicate, the pointer is reassigned.

For example:
class Uri {string value}
class Person {string name, Uri homepage}
class Registry {Person[ ] people}

Assume that there is one registry instance that acts as a root, and that Person, Uri, and string are immutable. An instance might be as follows (where the [$n] notation indicates a unique instance in memory):
Registry [$1] {
  Person [$2] {
  name: "Bart" [$3],
  homepage: Uri [$4] {
    value: "simpsons.com" [$5]
  }
  },
  Person [$6] {
  name: "Bart" [$7],
  homepage: Uri [$8] {
    value: "bartdesmet.net" [$9]
  }
  },
  Person [$10] {
  name: "Bart" [$11],
  homepage: Uri [$12] {
    value: "simpsons.com" [$13]
  }
  },
}

There are three level 3 unique object instances, but two people are identical, and many strings are also identical.

The string type is at level 0 and is found in two places: the "value" field of "Uri", and the "name" field of "Person". Starting from the roots (which in this example is registry), the heap walker 204 will construct a plan to go down these paths as follows:
for i in 0 . . . people.Length−1
  people[i]→name
  people[i]→homepage→value If registry is not the root, the traversal paths will be longer, and embodiments may optimize the traversal to avoid dereferencing the whole chain of pointers each and every time. Embodiments properly descend into the object graph, dereferencing each pointer at most once. In the example above, people[i] would only be read once.

The traversal expressions are passed to the deduplication logic of the heap walker 204 (that uses the dictionary 208) by reference:
for i in 0 . . . people.Length−1
  Opt(ref people[i]→name)
  Opt(ref people[i]→homepage→value)
  where Opt<T>(ref T value) has access to a Dictionary<T, T> where it looks up the value, and re-assigns it if it finds a duplicate:
Opt<T>(ref T value) {
  if (dictionary.TryGetValue(value, out var dup)
  value=dup;
  else
  dictionary.Add(value, value);
}

Applying this for strings in the example will result in re-assignments for people[1].name, people[2].name, and people[2].homepage.value:
Registry [$1] {
  Person [$2] {
  name: "Bart" [$3],
  homepage: Uri [$4] {
    value: "simpsons.com" [$5]
  }
  },
  Person [$6] {
  name: "Bart" [$3],
  homepage: Uri [$8] {
    value: "bartdesmet.net" [$9]
  }
  },
  Person [$10] {
  name: "Bart" [$3],
  homepage: Uri [$12] {
    value: "simpsons.com" [$5]
  }
  },
}

Uri is at level 1, so these objects are traversed next:
for i in 0 . . . people.Length−1
  Opt(ref people[i]→homepage)
  Using a dictionary where value equality of "Uri"s is replaced by reference equality of the containing "value" of type "string":
Registry [$1] {
  Person [$2] {
  name: "Bart" [$3],
  homepage: Uri [$4] {
    value: "simpsons.com" [$5]
  }
  },
  Person [$6] {
  name: "Bart" [$3],
  homepage: Uri [$8] {
    value: "bartdesmet.net" [$9]
  }
  },
  Person [$10] {
  name: "Bart" [$3],
  homepage: Uri [$4] {
    value: "simpsons.com" [$5]
  }
  },
}

Person is at level 2, so the last step for this example is:
for i in 0 . . . people.Length−1
  Opt(ref people[i])
  where equality of Person objects is based on reference equality for its name and homepage fields:
Registry [$1] {
  Person [$2] {
  name: "Bart" [$3],
  homepage: Uri [$4] {
    value: "simpsons.com" [$5]
  }
  },
  Person [$6] {
  name: "Bart" [$3],
  homepage: Uri [$8] {
    value: "bartdesmet.net" [$9]
  }

```
},
Person [$2] {
name: "Bart" [$3],
homepage: Uri [$4] {
   value: "simpsons.com" [$5]
  }
 },
}
```

Heap walkers are built by runtime code generation, thus bypassing slower mechanisms such as reflection that could be used to retrieve fields from objects at runtime. By generating efficient JIT-compiled code at runtime, a heap walk can be made allocation free, and be as efficient as a manually crafted piece of code that traverses objects.

Immutable Types

There are many examples of immutable types, including string types in languages such as C# and Java. To mutate instances of these types, new instances are created, containing a copy of the original data with the edit applied. For example, calling ToLower on a String instance causes a copy to be created. While this can be memory intensive, it makes the original type thread-safe and it makes instances safe for reuse.

For data structures such as immutable trees, making an edit involves minimal copying of data, because large portions of data can be reused. Note that by recursive reasoning, if a tree type is immutable, child nodes of a tree node are also of the same tree type, and thus immutable. Hence, child nodes can be reused to construct new parent nodes that incorporate some form of edit. For trees, this boils down to cloning the "spine" of the tree up to the root, while reusing child nodes as much as possible. Typically, such edits are mediated through an Update method that returns a new instance, reusing constituents that were not edited.

As an example, consider changing "1+2" to "3+2". Here the node representing "2" can be reused and embodiments construct a new binary addition node using a new left child representing "3". Another example is changing "1+2" to "1−2", which allows reusing the nodes representing "1" and "2" to create a new binary node for the subtraction.

Figure 3:
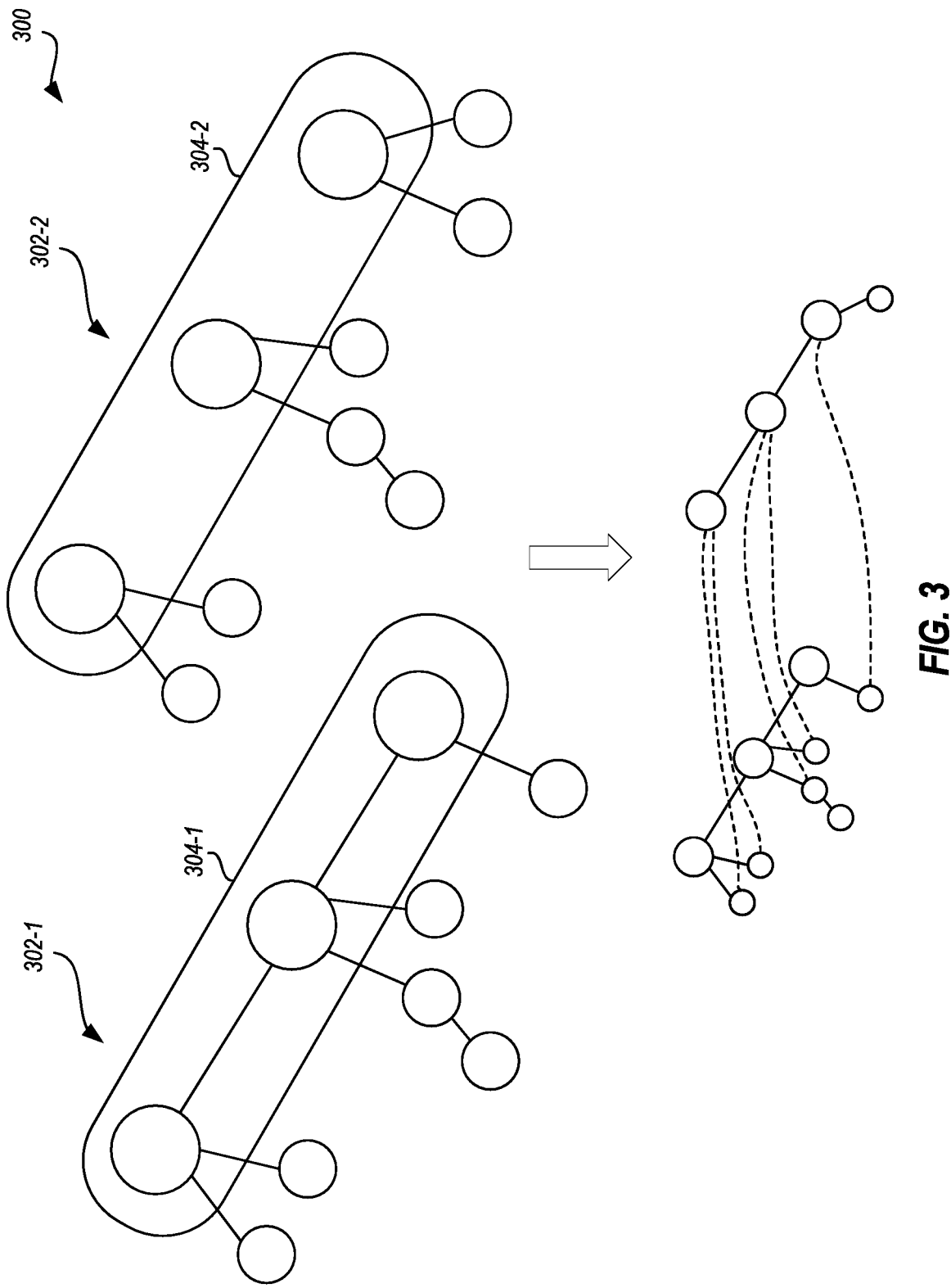
FIG. 3 illustrates cloning the spine of a data structure and replacing pointers with references.

A graphical example is illustrated in FIG. 3. FIG. 3 illustrates a data structure 300 with two sub-data structures 302-1 and 302-2, each having a spine 304-1 and 304-2 respectively. As illustrated in FIG. 3, the spines 304-1 and 304-2 cannot be compressed, but child nodes can be compressed through the use of references from nodes in the sub-data structure 302-2 to nodes in the sub-data structure 302-1.

Specification of immutable types can occur through a variety of alternative ways. One way is to enumerate a closed set of immutable types. The set is closed even under inheritance, because derived types may not be immutable even though a base type is. However, it could be half-open by incorporating base types automatically (if a derived type is immutable, the layout of the base should be as well), though there are exceptions to this rule. For example, a base type may be mutable, but the mutable fields are not used by a derived type. As such, an immutable derived type does not imply an immutable base type. Another way to specify immutable types is to use a type analysis provided by a framework, which analyzes the mutability of types. This is based on recursive reasoning of the layout of a type (i.e. by looking at its fields). Still another way to determine immutable types may be through the use of language based flags.

In particular, certain languages may be able to specify objects as being immutable by setting flags in the objects or in associated tables.

Automated analysis can yield false negatives, because some immutable data structures use safe mutation underneath, e.g. to lazily allocate portions of a data structure. For example, a URI representation may lazily populate an object containing detailed information about the URI upon accessing properties such as Host, Port, Schema, etc. This involves safe mutation.

As such, relying on a fixed set of types gives most control, but embodiments can use the (conservative) type analysis functionality during development time to create an initial set, which they can then augment themselves to create a fixed set.

As noted other mechanisms can be implemented to identify types as immutable. For example, metadata annotations on types to indicate that they are immutable, possibly inserted by a compiler, could be implemented. Functional languages tend to do such analyses.

Note that, as used herein, immutability is deep immutability. That is: a type is deemed immutable if and only if all the types it references for its data layout (i.e. the type of its fields) are immutable as well (or access patterns to mutable embedded structs always involve creating copies, thus mutation in place is never possible).

Given a list of immutable types discovered by any appropriate means, embodiments can theoretically discover the full set of candidates for deduplication in memory to achieve compaction. This set is simply the set of all objects that are instances of any of the immutable types. This list of types becomes the input to a heap walker builder, which creates optimized traversal code.

Value Equality

To determine whether two instances of an immutable data type are equal, and hence can be de-duplicated, embodiments include a comparator 206 for determining value-based equality. Embodiments support various means to implement the comparator 206, given the list of immutable types.

Some embodiments use the built-in Equals method override of an object (or some other equality operator, such as an == operator overload) to determine equality. This is referred to as intrinsic value-based equality.

Alternatively, or additionally, embodiments supply an equality comparer for an immutable type, to supply an extrinsic means to value-based equality. This mechanism is commonly used in data structures such as sets or dictionaries as well, and frameworks often provide an interface abstraction for it. As illustrated in FIG. 2, the dictionary 208 can provide entries for use by the comparator 206 to determine equality.

Note that using dictionaries can speed up search time for the dictionary to find a duplicate when the dictionary relies on a hash code, which allows for a "log n" search time. The dictionary is used to keep track of many instances of the same type, to look up duplicates. An alternative could be to keep a list of items and perform lookup by iterating the list and calling Equals on each entry. While dictionaries are illustrated herein, it should be appreciated that other mechanism may be used. Consider, for example, functionality provided by .NET available from Microsoft, Corporation of Redmond, Wash. In .Net, Dictionary<TKey, TElement> has a constructor that accepts an IEqualityComparer<TKey> which is used to compare keys for equality. However, a default IEqualityComparer<TKey> implementation exists, named EqualityComparer<TKey>.Default, which uses intrinsic value equality (using the Equals virtual method described above) to compare values. One optimization of finding duplicates at level N+1 relies on creating a dictionary for objects of type T at level N+1 where the equality comparer implementation does not use the intrinsic value equality comparer for object of type T, but rather it uses an IEqualityComparer<T> implementation where Equals is implemented in terms of reference equality for the fields of type T, of types TField* where these types are at levels <=N.

Alternatively, or additionally, the comparator 206 supports inferring value equality from value equality of an object's constituents (i.e. fields). Note that the notion of deep immutability lends itself well to this. That is, all fields of an immutable type are immutable themselves. Thus, if by determining value equality for all fields, embodiments automatically infer value equality of the objects containing these fields (using conjunction).

As described previously, the comparator 206 may further support reference equality. That is, if two instances are reference equal, they are atomically value equal. Thus, references to a common object by two different objects can serve as the basis for determining that the two different objects are atomically value equal.

To de-duplicate memory, embodiments proceed in a bottom-up fashion, starting from leaf nodes. Levels are associated with each object type to indicate distance to leaf nodes. For example, an expression representing "1"—a constant or literal—(in some embodiments) is always a leaf node. Some embodiments consider this to be level 0.

By de-duplicating leaf nodes first, embodiments can turn value equality checks (that would be needed anyway for any level >0 immutable data structure on top of the node) into reference equality checks when de-duplicating at level 1 (and higher level nodes as deduplication is performed at each level). This turns potentially unbounded traversal of objects to determine value equality into a constant pointer-sized equality check.

By having a guarantee that when de-duplicating at level 1, all deduplication has happened at level 0, a failure of a reference equality check is equivalent to value inequality. Note that embodiments typically run deduplication of level 0 before level 1 (in general, deduplication is run for level n before level n+1). There may be false negatives based on reference equality checks for newly created objects at a particular level, created after deduplication of the particular level. However, these will be identified in a subsequent pass, as the deduplication process is typically recursive. Note that in other embodiments, a "stop-the-world" event may be implemented, by temporarily halting object creation, to ensure that deduplication occurs for all immutable objects without new immutable objects being created, leading to false negatives.

The ability to rely on reference equality has the added benefit that lookup tables for value-based deduplication are needed less frequently. These are typically implemented as dictionaries or maps with custom (value) equality comparers passed to them, e.g. a Dictionary<T, T> and have the drawback of strongly rooting instances and defeating garbage collection.

However, some types do not have a statically assignable "level" because they are recursive types. The best example is a tree data structure, where only the leaf nodes can have a static level assigned. Type inheritance can also disturb static assignment of levels to types because a base type can be used to hold instances of derived types. When all derived types have a static level, then a level can be assigned. For example, if a type T has a single field F of (base) type B, and B has two derived types D1 and D2, then the level of T is only statically determined if D1 and D2 have a static level. The resulting level is the maximum of the two, plus 1.

When no static level can be assigned to a type, embodiments can resort to regular value-based equality using dictionary-like data structures. In some embodiments, this is performed after, and as a result of ensuring that these mapping data structures are short lived (according to some predetermined threshold) or use weak references to avoid keeping memory inadvertently alive for longer than necessary. Deduplication then proceeds by performing a lookup, for example, in a Dictionary<T, T> and returning the value.

Once de-duplicating objects at static levels that can be referenced higher up is finished, references created are applied to deduplication maps, for example, of the form Dictionary<T, T> using a custom equality comparer that relies on reference equality checks for all fields that have a static level assigned. Some embodiments check these first (because they are inexpensive) prior to checking all other fields for equality.

In particular, these are simply pointer comparisons, thus the check is constant in the number of fields that hold references. By first checking references for equality prior to checking values for equality, embodiments can bail out early if the references do not match. For example:

class C {
  BigValue v;
  D d;
}

If D was deduplicated in an earlier pass, simply checking whether the reference stored in field d matches across two instances of type C is a very inexpensive first check (e.g., comparing a 32-bit or 64-bit value). If embodiments were to compare BigValue first instead, those embodiments would need to run value equality checks on a big object (e.g. a BigInteger is really a list of integer components). By building custom equality comparers, embodiments can put the cheaper checks first. In fact, frequency analysis could be used to optimize this further.

For example:
class C {
  D d;
  E e;
}

When deduplicating instances of type D and E, there are 1M instances of type D and 1K instances of type E. The likelihood for instances of type E to match is higher than for instances of type D, simply because there are fewer. This cardinality information can be used to gather from deduplication passes over instances of type D and E to build an equality comparer for instances of type C that first checks reference equality for field "e" rather than "d".

Note that during analysis of types and their relationships, embodiments implement a strategy for heap walkers that scan and de-duplicate, roughly as follows. Order types by static level (from 0 to N), and de-duplicate in that order. For types with a static level referenced by at least one type without a static level, start to track the object in a deduplication catalog.

Types without a static level assigned are de-duplicated after types with a static level by consulting the deduplication catalog to locate duplicates. For these objects, embodiments attempt to locate a copy in the catalog. If a match is found, it is replaced by the value already kept in the catalog. Otherwise, the object is added to catalog (both as a key and a value for an entry, i.e. an identity mapping).

The mechanism to de-duplicate an instance of a type is based on field re-assignment, for which code is generated at runtime to make this operation efficient. Note that field assignment is pointer-sized for all the data in question, so it is atomic and thread-safe. Note that some embodiments may choose not to flush CPU caches, thus other threads may continue to refer to an original non-deduplicated object copy. This is transient and safe due to the immutable nature of these objects, and can avoid expensive CPU cache flushes.

Mechanism Versus Policy

Embodiments described above effectively implement a bottom-up visit of the heap and de-duplicate unconditionally based on value equality. However, heap walkers can also be used to make better informed decisions about deduplications.

For example, a heap walker can be used to determine the size of each object (including all its children) to prioritize de-duplicating larger objects according to some predetermined threshold. In some embodiments, this can be based on a priority queue.

Another example of a policy could be to run the compactor in an analysis mode where each object encountered is put in some table (using weak references) to keep track of liveness, possibly with a counter to keep track of how many consecutive compactions have encountered the object during a heap scan. If an object is active for a predetermined number of compactions, the object is made available for compaction. This helps to ensure that short lived objects will not be compacted, wasting valuable computation resources.

The time to trigger a compaction is also subject to various alternative policies. One such policy is based on a simple periodic and/or random timer. Another policy is based on memory pressure. For example, a determination can be made that additional memory space is required, triggering compaction. Another policy is based on attempting to suppress compaction during recovery of a replica. Compaction during recovery of a replica will cause a large number of allocations in a short amount of time during a period where recovery time is critical. In such situations, it is inefficient to use processor cycles on compaction.

Miscellaneous

The root objects given to a memory compression system may not be immutable themselves but provide a path to reach the immutable object of a specified set of types. As such, there may be a long traversal path to eventually reach immutable objects, possibly through internal types of a library. For example, a query engine may hold a registry dictionary containing the computation expressions that are immutable.

To reduce the scan time to reach these immutable artifacts, the set of roots can be refined by the compression system itself. For example, the compression system starts with the given roots until it finds an object that has at least one child that is of an immutable type. These discovered objects can act as new roots to bypass the object reference graph on top of it. This refinement may need to be repeated. In particular, given that the top-level object graph is mutable, there is no guarantee that the newly discovered roots are not going to be replaced at some point, so embodiments may be capturing an object that is a root having an immutable child at a certain point in time, but may not continue to be a root having an immutable child in the future. As such, this optimization can be repeated periodically.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 5, a method 500 is illustrated. The method 500 includes acts for compressing immutable data structures on a computing system. Note that the acts of the method 500 can be understood in the context of FIG. 1. The lookup table implemented in the method 500, may be implemented as a dictionary in FIG. 1.

The method includes identifying first level immutable data objects of a first immutable data object type at a first level of a multilevel data structure (act 502).

The method 500 further includes populating a first lookup table with entries, each entry comprising a first level immutable data object and a first level value of the first level immutable data object, wherein populating the first lookup table comprises, as a result of identifying a first instance of a particular first level immutable data object, populating an entry with the particular first level immutable data object (act 504).

The method 500 further includes, for the particular first level immutable data object, identifying a duplicate instance of the particular first level immutable data object, the duplicate instance of the particular first level immutable data object being pointed to by a first pointer from a particular instance of a particular second level immutable data object (act 506)

The method 500 further includes, as a result of the particular first level immutable data object being in the lookup table, replacing the first pointer with a reference to the first instance of the particular first level immutable data object (act 508).

The method 500 further includes, causing the duplicate instance of the particular first level immutable data object from memory, freeing storage space on the computing system (act 510).

The method 500 further includes, identifying second level immutable data objects at the second level of the multilevel data structure (act 512).

The method 500 further includes, populating a second lookup table with entries, each of one or more of the entries comprising a second level immutable data object and a second level reference to a first instance of a first level immutable data object, wherein populating the second lookup table comprises populating a particular second level lookup table entry with the particular second level immutable data object and the reference to the first instance of the particular first level immutable data object (act 514).

Note that while the method 500 shows two levels being deduplicated, it should be appreciated that embodiments can be implemented using the same principles to deduplicate any number of levels of a data structure.

The method 500 may further include, after completing compression for the identified first level immutable data objects at the first level, deleting the first lookup table. This is often done to control memory leaks to prevent the lookup table from growing.

The method 500 may further include, after completing compression for the identified first level immutable data objects at the first level, deleting all but a predetermined set of entries in the first lookup table. This can be done to control memory leaks, while balancing having the lookup table available for other purposes, such as subsequent iterations of the compression process.

The method 500 may further include, after completing compression for the identified first level immutable data objects at the first level, preserving the first lookup table, and using the preserved first lookup table to identify immutable data types.

The method 500 may further include, after completing compression for the identified second level immutable data objects at the second level, deleting the second lookup table. That is, each lookup table may be deleted when no longer needed for compression.

The method 500 may further include, after completing compression for the identified second level immutable data objects at the second level, deleting all but a predetermined set of entries in the second lookup table.

The method 500 may further include, after completing compression for the identified second level immutable data objects at the second level, preserving the second lookup table, and using the preserved second lookup table to begin compression in a subsequent iteration.

The method 500 may further include, populating the particular second level lookup table entry with one or more additional values. For example, such values may include references, strings, integers, or other appropriate values that can be used for comparisons.

The method 500 may further include, using the particular second level lookup table entry to compress additional data structures by causing duplicate instances of the particular second level immutable data object including instances having the reference to the first instance of the particular first level immutable data object to be deleted. Thus, as with the first lookup table, the second lookup table can be used to replace pointers with references and deleting duplicate objects to further compress the data structure.

Figure 4:
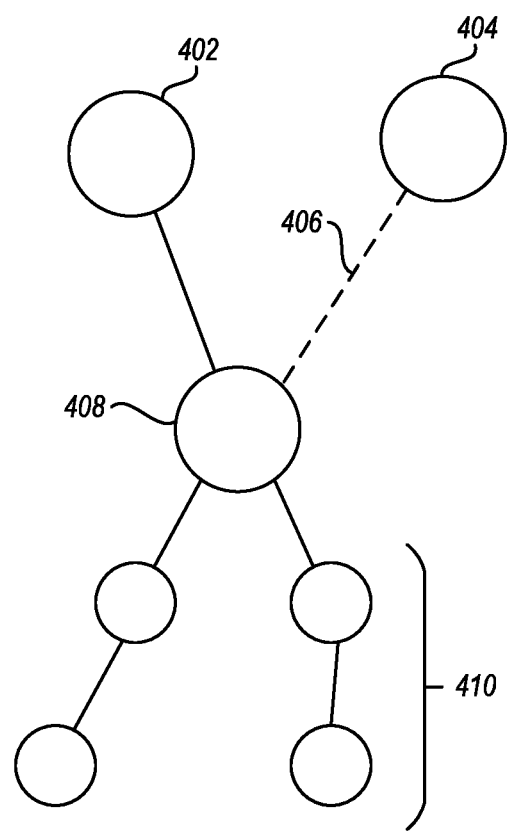
FIG. 4 illustrates multi-level equality analysis by using reference equality.

The method 500 may further include, adding at least one lookup table entry to a lookup table that comprises a reference that incorporates references in a plurality of levels. An example of this is illustrated in FIG. 4, which illustrates that the reference 406 to object 408 incorporates references to lower level objects 410.

The method 500 may be practiced where identifying immutable data objects comprises performing a type analysis on data objects. In particular, embodiments may analyze various data objects to determine if they are immutable. This can be done by evaluating properties of objects, pointer and references, and other elements.

The method 500 may be practiced where identifying immutable data objects comprises identifying that data objects are of a type known to be immutable. For example, a known list of immutable types may be referenced to determine if an object is immutable. For example, strings are one type of object that is always immutable.

The method 500 may be practiced where identifying immutable data objects comprises analyzing a language specific flag for a data object, the flag being configured to identify immutable data objects. As noted previously, certain programming languages can set flags identifying objects as immutable.

Figure 6:
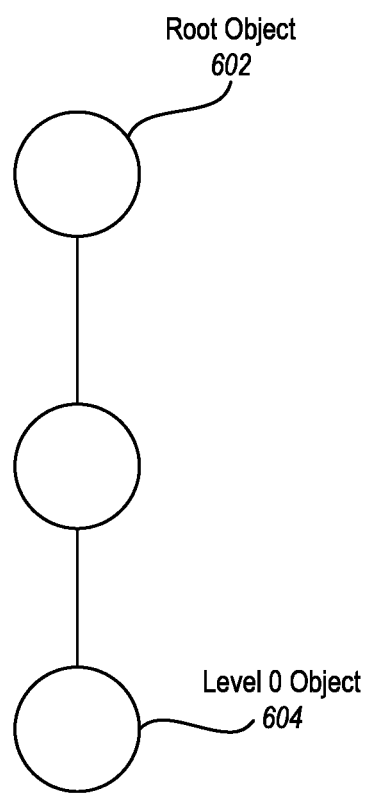
FIG. 6 illustrates known traversal of data objects.

The method 500 may be practiced where identifying data objects as being at a particular level comprises using a beginning type (i.e., a root), and using known traversals of the beginning type to traverse the multilevel data structure to a particular level. For example, FIG. 6 illustrates a root object 602. The root object 602 may be of a particular type. It may be known that that particular type requires two node hops to traverse to a leaf node, such as the level 0 object 604. Thus, by identifying roots, and knowing how to traverse a data structure from the root, a particular level can be identified.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of compressing immutable data structures on a computing system, the method comprising:
    identifying first level immutable data objects of a first immutable data object type at a first level of a multi-level data structure;
    populating a first lookup table with entries, each entry comprising a first level immutable data object and a first level value of the first level immutable data object;
    wherein populating the first lookup table comprises, as a result of identifying a first instance of a particular first level immutable data object, populating an entry with the particular first level immutable data object;
    for the particular first level immutable data object, identifying a duplicate instance of the particular first level immutable data object, the duplicate instance of the particular first level immutable data object being pointed to by a first pointer from a particular instance of a particular second level immutable data object;
    as a result of the particular first level immutable data object being in the lookup table, replacing the first pointer with a reference to the first instance of the particular first level immutable data object;
    causing the duplicate instance of the particular first level immutable data object to be removed from memory, freeing storage space on the computing system;
    identifying second level immutable data objects at a second level of the multilevel data structure;
    populating a second lookup table with entries, each of one or more of the entries comprising a second level immutable data object and a second level reference to a first instance of a first level immutable data object; and
    wherein populating the second lookup table comprises populating a particular second level lookup table entry with the particular second level immutable data object and the reference to the first instance of the particular first level immutable data object.

2. The method of claim 1, further comprising, after completing compression for the identified first level immutable data objects at the first level, deleting the first lookup table.

3. The method of claim 1, further comprising, after completing compression for the identified first level immutable data objects at the first level, deleting all but a predetermined set of entries in the first lookup table.

4. The method of claim 1, further comprising, after completing compression for the identified first level immutable data objects at the first level, preserving the first lookup table, and using the preserved first lookup table to identify immutable data types.

5. The method of claim 1, further comprising, after completing compression for the identified second level immutable data objects at the second level, deleting the second lookup table.

6. The method of claim 1, further comprising, after completing compression for the identified second level immutable data objects at the second level, deleting all but a predetermined set of entries in the second lookup table.

7. The method of claim 1, further comprising, after completing compression for the identified second level immutable data objects at the second level, preserving the second lookup table, and using the preserved second lookup table to begin compression in a subsequent iteration.

8. The method of claim 1, further comprising populating the particular second level lookup table entry with one or more additional values.

9. The method of claim 1, further comprising using the particular second level lookup table entry to compress additional data structures by causing duplicate instances of the particular second level immutable data object including instances having the reference to the first instance of the particular first level immutable data object to be deleted.

10. The method of claim 1, further comprising adding at least one lookup table entry to a lookup table that comprises a reference that incorporates references in a plurality of levels.

11. The method of claim 1, wherein identifying immutable data objects comprises performing a type analysis on data object.

12. The method of claim 1, wherein identifying immutable data objects comprises identifying that data objects are of a type known to be immutable.

13. The method of claim 1, wherein identifying immutable data objects comprises analyzing a language specific flag for a data object, the flag being configured to identify immutable data objects.

14. The method of claim 1, wherein identifying data objects as being at a particular level comprises using a beginning type, and using known traversals of the beginning type to traverse the multilevel data structure to a particular level.

15. A computer system comprising:

one or more processors; and one or more computer-readable media having stored thereon instructions that are executable by the one or more processors to configure the computer system to compress immutable data structures on a computing system, including instructions that are executable to configure the computer system to perform at least the following:

identify first level immutable data objects of a first immutable data object type at a first level of a multi-level data structure;

populate a first lookup table with entries, each entry comprising a first level immutable data object and a first level value of the first level immutable data object;

wherein populating the first lookup table comprises, as a result of identifying a first instance of a particular first level immutable data object, populating an entry with the particular first level immutable data object;

for the particular first level immutable data object, identify a duplicate instance of the particular first level immutable data object, the duplicate instance of the particular first level immutable data object being pointed to by a first pointer from a particular instance of a particular second level immutable data object;

as a result of the particular first level immutable data object being in the lookup table, replace the first pointer with a reference to the first instance of the particular first level immutable data object;

cause the duplicate instance of the particular first level immutable data object to be removed from memory, freeing storage space on the computing system;

identify second level immutable data objects at a second level of the multilevel data structure;

populate a second lookup table with entries, each of one or more of the entries comprising a second level immutable data object and a second level reference to a first instance of a first level immutable data object; and wherein populating the second lookup table comprises populating a particular second level lookup table entry with the particular second level immutable data object and the reference to the first instance of the particular first level immutable data object.

16. The computer system of claim 15, wherein identifying immutable data objects comprises performing a type analysis on data object.

17. The computer system of claim 15, wherein identifying immutable data objects comprises identifying that data objects are of a type known to be immutable.

18. The computer system of claim 15, wherein identifying immutable data objects comprises analyzing a language specific flag for a data object, the flag being configured to identify immutable data objects.

19. The computer system of claim 15, wherein identifying data objects as being at a particular level comprises using a beginning type, and using known traversals of the beginning type to traverse the multilevel data structure to a particular level.

20. A computer system comprising:

one or more processors; and one or more computer-readable media having stored thereon instructions that are executable by the one or more processors to configure the computer system to implement:

a heap walker, wherein the heap walker comprises a comparator;

wherein the comparator is configured to compare objects in an object heap with entries in lookup tables, the entries in the lookup tables being entered into the lookup tables as a result of identifying particular instances of objects, to determine if objects in the object heap are duplicates of objects in the lookup tables, wherein the comparator is configured to compare references of objects in the object heap to hierarchically lower level objects to references of objects in the lookup tables to determine if objects in the object heap are duplicates of objects in the lookup tables; and wherein the heap walker is configured to replace duplicates in the object heap with references to the particular instances of objects.

* * * * *